US011320797B2

(12) United States Patent
Nixon et al.

(10) Patent No.: US 11,320,797 B2
(45) Date of Patent: May 3, 2022

(54) METHODS AND APPARATUS TO VIRTUALIZE A PROCESS CONTROL SYSTEM

(75) Inventors: Mark Nixon, Round Rock, TX (US); John Mark Caldwell, Austin, TX (US)

(73) Assignee: FISHER-ROSEMOUNT SYSTEMS, INC, Round Rock, TX (US)

(*) Notice: Subject to any disclaimer, the term of this patent is extended or adjusted under 35 U.S.C. 154(b) by 2067 days.

(21) Appl. No.: 15/517,891

(22) PCT Filed: Sep. 27, 2011

(86) PCT No.: PCT/US2011/053467
§ 371 (c)(1),
(2), (4) Date: Jun. 27, 2017

(87) PCT Pub. No.: WO2012/047654
PCT Pub. Date: Apr. 12, 2012

(65) Prior Publication Data
US 2017/0300024 A1    Oct. 19, 2017

Related U.S. Application Data

(60) Provisional application No. 61/386,810, filed on Sep. 27, 2010.

(51) Int. Cl.
*G05B 19/042*    (2006.01)
*G06F 11/20*    (2006.01)
(Continued)

(52) U.S. Cl.
CPC ..... *G05B 19/0423* (2013.01); *G05B 19/4186* (2013.01); *G06F 11/1484* (2013.01);
(Continued)

(58) Field of Classification Search
CPC ............... G06F 11/1484; G06F 11/203; G06F 2201/815; G06F 2201/805; G06F 9/4856;
(Continued)

(56) References Cited

U.S. PATENT DOCUMENTS 5,488,716 A * 1/1996 Schneider ........... G06F 11/1691
714/10
5,506,964 A    4/1996 Beukema
(Continued)

FOREIGN PATENT DOCUMENTS

CN    101183315    5/2008
DE    WO2004/031874 A1 * 9/2003 ........... G05B 19/056
(Continued)

OTHER PUBLICATIONS

International Searching Authority, "International Search Report and Written Opinion," issued in connection with PCT Application No. PCT/US2011/053467, dated Jan. 13, 2012, 14 pages.
(Continued)

*Primary Examiner* — Jorge A Chu Joy-Davila
(74) *Attorney, Agent, or Firm* — Hanley, Flight & Zimmerman LLC

(57) ABSTRACT

Methods and apparatus to virtualize a process control system are described. A described process control system includes a server cluster including one or more servers. When operating, the server cluster provides a virtual workstation or virtual server, a virtual controller to interoperate with the virtual workstation or server and to implement process control operations, and a virtual input/output device to interoperate with the virtual controller and coupled to one or more field devices within the process control system.

24 Claims, 13 Drawing Sheets

(51) Int. Cl.
*G05B 19/418* (2006.01)
*G06F 11/14* (2006.01)

(52) U.S. Cl.
CPC .. *G06F 11/203* (2013.01); *G05B 2219/13144* (2013.01); *G06F 2201/805* (2013.01); *G06F 2201/815* (2013.01); *Y02P 90/02* (2015.11); *Y02P 90/80* (2015.11)

(58) Field of Classification Search
CPC ............ G05B 19/4186; G05B 19/0423; G05B 2219/13144; Y02P 90/185; Y02P 90/86
See application file for complete search history.

(56) References Cited

U.S. PATENT DOCUMENTS

| | | | |
|---|---|---|---|
| 5,784,546 A * | 7/1998 | Benman, Jr. | G06Q 30/02 715/207 |
| 5,995,916 A | 11/1999 | Nixon et al. | |
| 6,195,591 B1 | 2/2001 | Nixon et al. | |
| 6,298,377 B1 | 10/2001 | Hartikainen et al. | |
| 6,424,872 B1 | 7/2002 | Glanzer et al. | |
| 6,502,205 B1 * | 12/2002 | Yanai | G06F 3/0601 714/6.32 |
| 6,510,352 B1 * | 1/2003 | Badavas | G05B 19/0426 700/18 |
| 6,788,980 B1 | 9/2004 | Johnson | |
| 6,973,508 B2 | 12/2005 | Shepard et al. | |
| 6,975,966 B2 | 12/2005 | Scott et al. | |
| 7,050,863 B2 | 5/2006 | Mehta et al. | |
| 7,096,078 B2 | 8/2006 | Burr et al. | |
| 7,133,794 B1 | 11/2006 | Brayton et al. | |
| 7,151,966 B1 * | 12/2006 | Baier | G05B 19/056 700/19 |
| 7,181,550 B2 | 2/2007 | Shepard et al. | |
| 2002/0184410 A1 * | 12/2002 | Apel | G06F 11/0745 710/5 |
| 2004/0049524 A1 * | 3/2004 | Toyota | B25J 9/1669 |
| 2004/0111499 A1 | 6/2004 | Dobrowski et al. | |
| 2004/0177242 A1 * | 9/2004 | Erickson | H04L 12/12 713/2 |
| 2004/0249483 A1 | 12/2004 | Wojsznis et al. | |
| 2004/0249651 A1 | 12/2004 | Fischer et al. | |
| 2005/0096872 A1 | 5/2005 | Blevins et al. | |
| 2006/0064512 A1 | 3/2006 | Shepard et al. | |
| 2006/0224250 A1 * | 10/2006 | Callaghan | G05B 19/054 700/1 |
| 2007/0083275 A1 | 4/2007 | Law et al. | |
| 2008/0082976 A1 * | 4/2008 | Steinwagner | G06F 8/63 718/1 |
| 2008/0134215 A1 * | 6/2008 | Thibault | G05B 19/41835 719/320 |
| 2008/0189700 A1 * | 8/2008 | Schmidt | G06F 11/203 718/1 |
| 2008/0256501 A1 * | 10/2008 | Armstrong | G06F 9/4856 716/125 |
| 2009/0112335 A1 * | 4/2009 | Mehta | G05B 17/02 700/29 |
| 2009/0172666 A1 * | 7/2009 | Yahalom | G06F 9/455 718/1 |
| 2009/0282404 A1 * | 11/2009 | Khandekar | G06F 9/45558 718/1 |
| 2010/0154051 A1 | 6/2010 | Bauer | |
| 2011/0225285 A1 * | 9/2011 | Patel | G06F 9/4856 709/224 |
| 2012/0054367 A1 * | 3/2012 | Ramakrishnan | G06F 9/4856 709/242 |
| 2015/0095788 A1 * | 4/2015 | Thiele | H04L 41/0806 715/735 |

FOREIGN PATENT DOCUMENTS

| | | |
|---|---|---|
| DE | 102007030396 | 1/2009 |
| JP | H05134889 | 6/1993 |
| JP | H0764602 | 3/1995 |
| JP | 2002149212 | 5/2002 |
| JP | 2003067016 | 3/2003 |
| JP | 2003091310 | 3/2003 |
| JP | 2006237291 | 9/2006 |
| JP | 2009048607 | 3/2009 |
| JP | 2009064094 | 3/2009 |
| JP | 2009187090 | 8/2009 |
| WO | 2010102875 | 9/2010 |

OTHER PUBLICATIONS

International Searching Authority, "International Preliminary Report on Patentability," issued in connection with PCT Application No. PCT/US2011/053467, dated Apr. 2, 2013, 7 pages.

Antonopoulos, "Virtual machines help with disaster recovery," [http://web.archive.org/web/20061116005942/http://nemertes.com/node/1368/print], retrieved on Apr. 6, 2017, 2 pages.

Microsoft, "Generation Workflow," The Architecture Journal, Journal 7, 2006, 44 pages.

Microsoft, "Data by Design," The Architecture Journal, Journal 8, 2006, 44 pages.

Sehmi et al., "Service-Oriented Modeling for Connected Systems—Part 1," The Architecture Journal, Journal 7, 2006, 9 pages.

Sehmi et al., "Service-Oriented Modeling for Connected Systems—Part 2," The Architecture Journal, Journal 8, 2006, 6 pages.

State Intellectual Property Office of China, "First Office Action," issued in connection with Chinese Patent Application No. 201180056199.4, dated Sep. 6, 2015, 7 pages.

Japanese Patent Office, "Notice of Reasons for Rejection," issued in connection with Japanese Patent Application No. 2013-531724, dated Aug. 18, 2015, 5 pages.

Japanese Patent Office, "Decision of Refusal," issued in connection with Japanese Patent Application No. 2013-531724, dated Jun. 14, 2016, 6 pages.

Intellectual Property Office of the United Kingdom, "Examination Report," issued in connection with Patent Application No. GB1305343.4, dated Jun. 12, 2013, 1 page.

Intellectual Property Office of the United Kingdom, "Examination Report," issued in connection with Patent Application No. GB1305343.4, dated Jan. 6, 2015, 4 pages.

Clark et al. "Live migration of virtual machines," Proceedings of the Symposium on Networked Systems Design and Implementation, Usenix Association, Jan. 1, 2005, 14 pages.

Japanese Patent Office, "Notice of Reasons for Rejection," issued in connection with Japanese Patent Application No. 2016-187112, dated Mar. 27, 2018, 3 pages.

German Patent Office, "Office Action," issued in connection with German Patent Application No. 112011103241.2, dated Mar. 11, 2021, 7 pages (English translation not available).

Hirofichi et al., "USB/IP: A Transparent Device Sharing Technology over IP Network," IPSJ Dig. Courier, vol. 1, pp. 394-406, Sep. 2005, 13 pages.

* cited by examiner

METHODS AND APPARATUS TO VIRTUALIZE A PROCESS CONTROL SYSTEM

RELATED APPLICATION

This patent claims the benefit of the filing date of U.S. Provisional Patent Application No. 61/386,810, filed on Sep. 27, 2010, the entire disclosure of which is incorporated by reference herein in its entirety.

FIELD OF THE DISCLOSURE

The present disclosure relates generally to process control systems and, more particularly, to methods and apparatus to virtualize a process control system.

BACKGROUND

Process control systems, like those used in chemical, petroleum or other processes, typically include one or more process controllers and input/output (I/O) devices communicatively coupled to at least one host or operator workstation and to one or more field devices via analog, digital or combined analog/digital buses. The field devices, which may be, for example, valves, valve positioners, switches and transmitters (e.g., temperature, pressure and flow rate sensors), perform process control functions within the process such as opening or closing valves and measuring process control parameters. The process controllers receive signals indicative of process measurements made by the field devices, process this information to implement a control routine, and generate control signals that are sent over the buses or other communication lines to the field devices to control the operation of the process. In this manner, the process controllers may execute and coordinate control strategies using the field devices via the buses and/or other communication links communicatively coupling the field devices.

Process information from the field devices and the controllers may be made available to one or more applications (i.e., software routines, programs, etc.) executed by the operator workstation (e.g., a processor-based system) to enable an operator to perform desired functions with respect to the process, such as viewing the current state of the process (e.g., via a graphical user interface), evaluating the process, modifying the operation of the process (e.g., via a visual object diagram), etc. Many process control systems also include one or more application stations. Typically, these application stations are implemented using a personal computer, workstation, or the like that is communicatively coupled to the controllers, operator workstations, and other systems within the process control system via a local area network (LAN). Each application station may include a graphical user interface that displays the process control information including values of process variables, values of quality parameters associated with the process, process fault detection information, and/or process status information.

SUMMARY

An example process control system includes a server cluster including one or more servers. The server cluster, when operating, provides a virtual workstation or virtual server, a virtual controller to interoperate with the virtual workstation or server and to implement process control operations, and a virtual input/output device to interoperate with the virtual controller and coupled to one or more field devices within the process control system.

Another example process control system a multi-core processing unit. The multi-core processing unit, when operating, provides a virtual controller to interoperate with a workstation or server and to implement process control operations, and a virtual input/output device to interoperate with the virtual controller and coupled to one or more field devices within the process control system.

An example method of controlling a process system involves establishing a virtual workstation or virtual server, establishing a virtual controller to interoperate with the virtual workstation or server and to implement process control operations, and establishing a virtual input/device to interoperate with the virtual controller.

DETAILED DESCRIPTION

Figure 1:
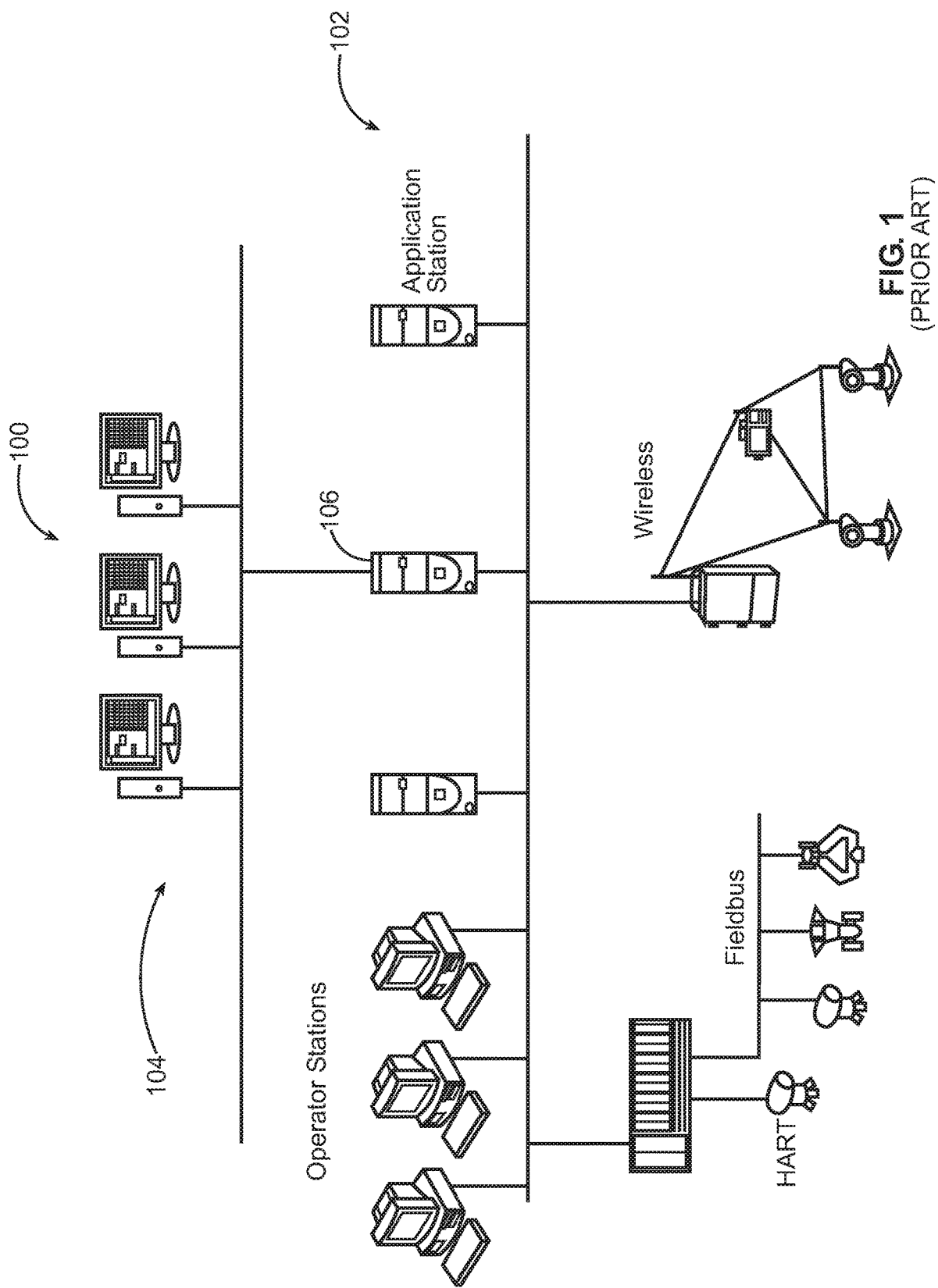
FIG. 1 depicts a known control system architecture.

Although the following describes example methods and apparatus including, among other components, software and/or firmware executed on hardware, it should be noted that these examples are merely illustrative and should not be considered as limiting. For example, it is contemplated that any or all of the hardware, software, and firmware components could be embodied exclusively in hardware, exclusively in software, or in any combination of hardware and software. Accordingly, while the following describes example methods and apparatus, persons of ordinary skill in the art will readily appreciate that the examples provided are not the only way to implement such methods and apparatus.

The combination of technology advances in computer architecture such as multi-core processing units, commercial operating systems, and networking has enabled the development of effective, easy-to-manage, virtualized computing environments. Such virtualized environments have been used by information technology departments to lower costs and improve system up-time. Although the shift to centralized computing resources running servers and clients hosted in virtualized environments is well established, an architecture to apply such virtualized environments to manufacturing environments or, more generally, process control systems and, particularly, real-time embedded environments has not been available.

The example methods and apparatus described herein may be used to virtualize an entire process control environment or system, including such environments or systems employing embedded processing units. More specifically, the example methods and apparatus described herein may provide a process control system architecture that enables workstations, servers, controllers, input/output devices, and field devices to be virtualized via a server cluster having one or more servers. Thus, an entire process control system may be implemented within such a virtualization environment or architecture, thereby significantly increasing the flexibility and robustness of the process control system. For example, any of the virtualized portions of the process control system can be easily migrated from one server within the server cluster to another server or servers during operation of the process control system for maintenance purposes, in response to the failure of a server, in response to a need to otherwise shut down a server, a need to balance resources within the server cluster, etc. Such migration can occur without any loss of data and without having to interrupt communications between, for example, a virtualized operator interface and other virtualized portions of the process control system such as the input/output devices and/or controllers. Further, the servers of the server cluster may be co-located and/or may be in different geographic areas.

In one particular example, a process control system may be implemented with a server cluster including one or more servers, where the server cluster, when operating, provides a virtual workstation or virtual server, a virtual controller to interoperate with the virtual workstation or server and to implement process control operations, and a virtual input/output device to interoperate with the virtual controller and coupled to one or more field devices within the process control system. The virtual workstation may, for example, provide a user interface to the process control system such as an operator interface, a diagnostics interface or a configuration interface. The virtual server may, for example, provide a backend service to the process control system such as data storage or collection, a configuration function, a calculation function, or an interface to another system.

The architecture of the server cluster may employ at least one virtual machine server to interoperate with guest operating systems corresponding to each of the virtual workstation or server, the virtual controller, and the virtual input/output device. Additionally, the architecture may include a storage area network to store data for the guest operating systems. Users may access the virtual workstation or server via a remote desktop service implemented via a personal computer, another workstation, or a thin client device. Further, in addition to virtualizing workstations, servers, controller and I/O devices, the architecture may also be used to virtualize field devices, thereby facilitating simulation and/or any other testing.

The foregoing example architecture may be extended for use with embedded systems and, alternatively or additionally, the virtual workstation or server, the virtual controller and/or the virtual input/output device may be implemented via one or more multi-core processing units.

Before discussing the example methods and apparatus to virtualize a process control system in more detail, a discussion of digital control systems (DCSs) is provided below in connection with FIGS. 1, 2 and 3. DCSs are deployed in configurations ranging from a standalone laptop, which is primarily used for focused training and design activities, to multi-zone configurations to control an entire plant. In some cases, a DCS may extend over a wide geographic area with, for example, a portion of the system covering onshore operations and offshore components controlling platforms many kilometers offshore. In some process plants, the DCS is integrated with business systems providing real-time access to lab data, scheduling, maintenance systems, etc.

FIG. 1 illustrates a known control system 100. As shown in FIG. 1, workstations and servers 102 provide a variety of functions including operator interfaces, maintenance, historical data collection, and integration with the plant network. In many cases, users are provided with remote access to the DCS via thin clients 104 using terminal services, for example, via a virtual private network (VPN) connection. These connections may connect through one or more terminal servers 106 and may generally be referred to as thin client connections.

In some examples, portions of the system 100 may be remote from the main control system. The network connecting these remote operations may include communication links via an Ethernet backhaul, phone lines, cable, fiber, microwave, and/or satellite. Security, sampling times, and reliability are generally considered for such remote connections.

Figure 2:
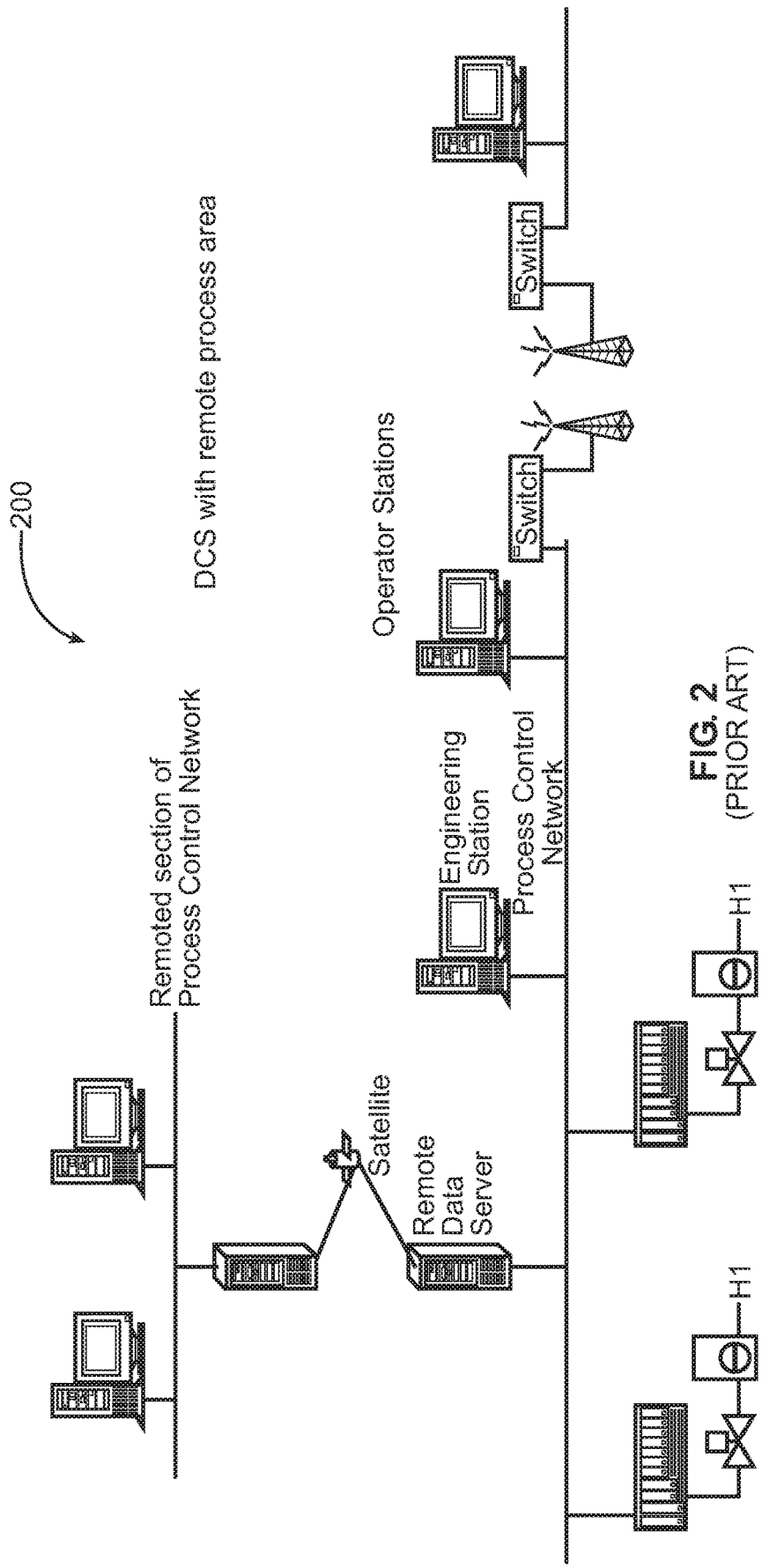
FIG. 2 depicts a known control system architecture having a remote portion.

FIG. 2 illustrates another known control system 200 with a remote operation. In many instances, the DCS may be fully integrated into the overall plant operation, and it is not uncommon for the DCS, safety systems, burner management, and machine health functions to be integrated.

Figures 3, 3A:
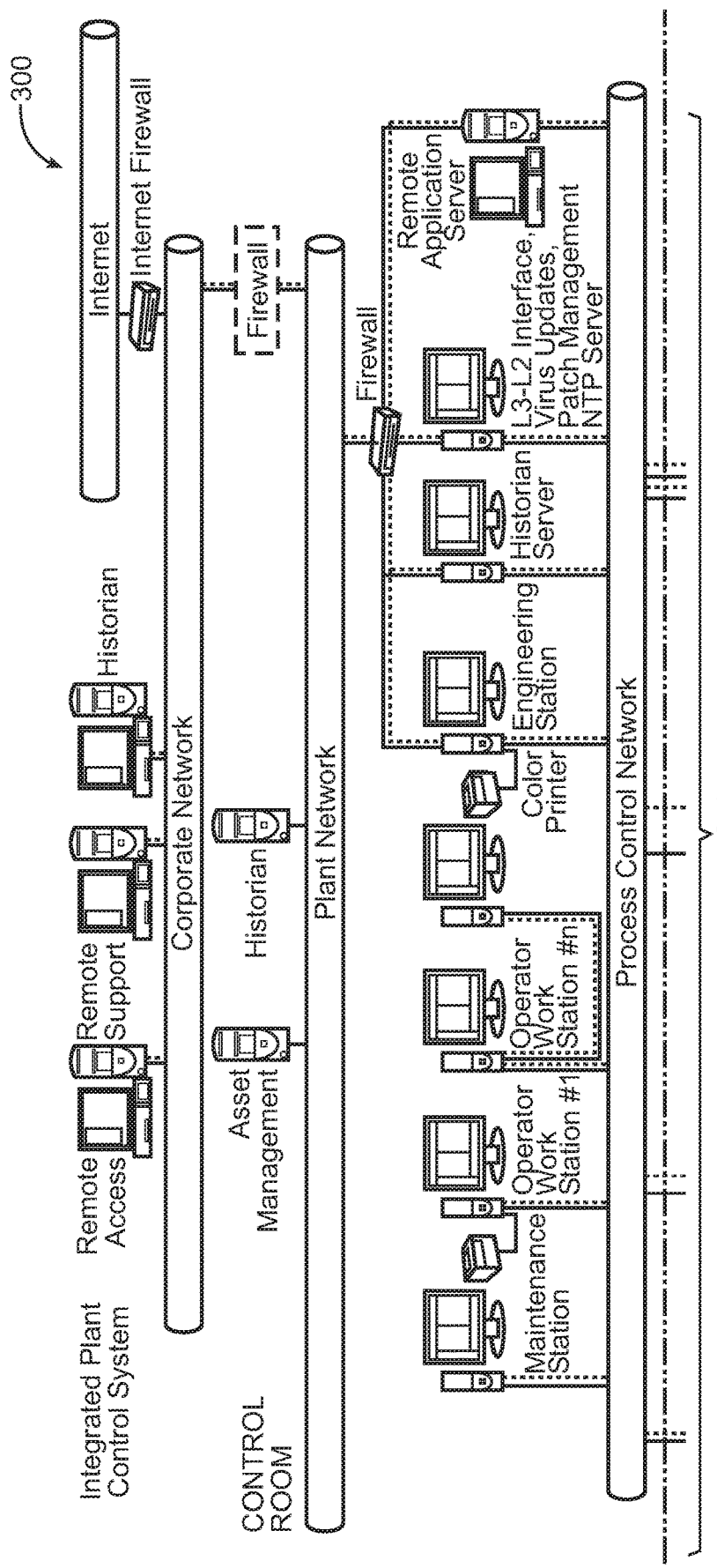
FIGS. 3A and 3B depict another known control system architecture including fully integrated plant functions.
Figure 3B:
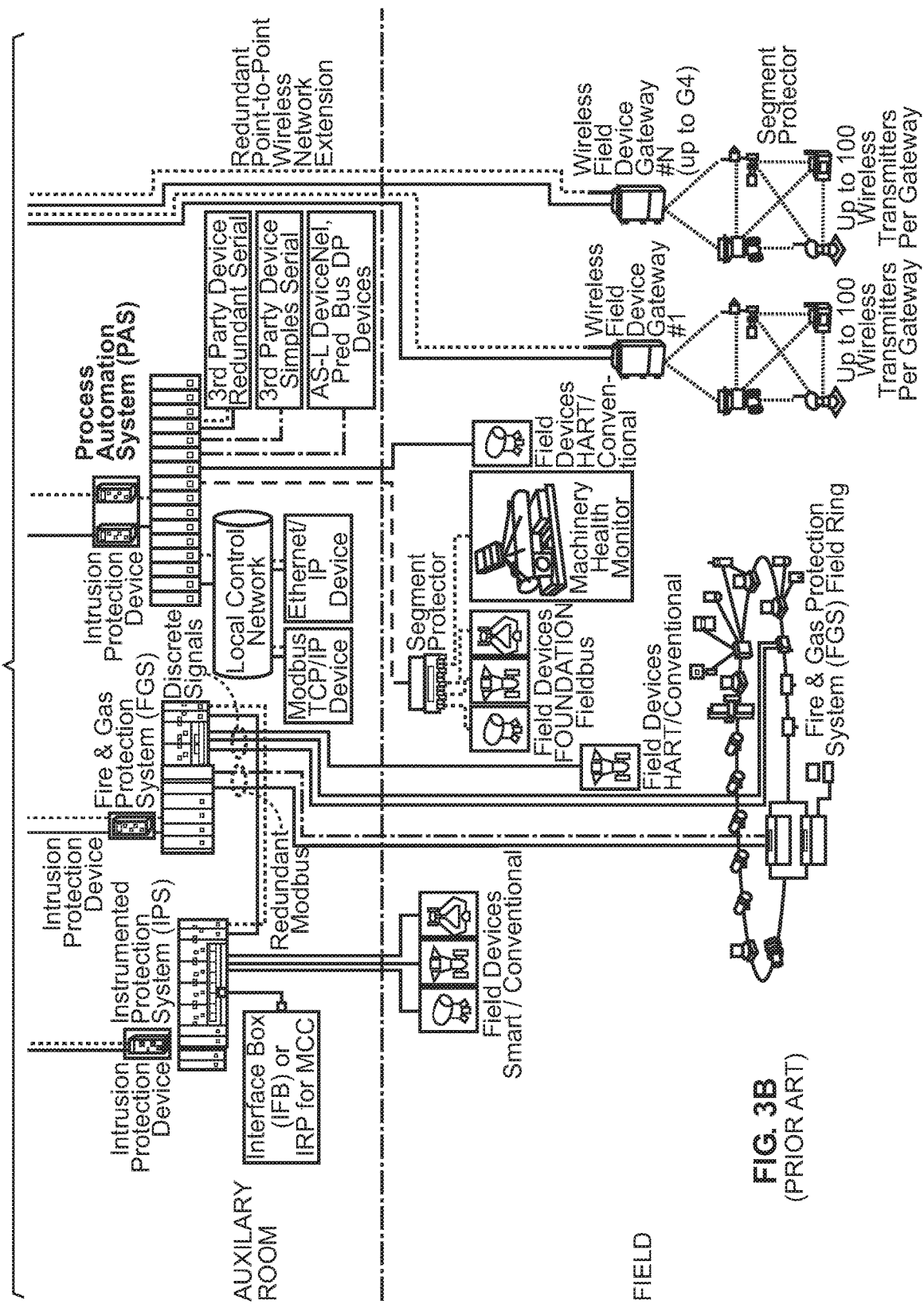

FIGS. 3A and 3B illustrate a system 300 with fully integrated plant functions. Distributed control systems such as the one shown in FIGS. 3A and 3B are made of workstations and servers, controllers, input/output devices, field devices, control technology, and applications such as plant data historians. As described in greater detail below, the example system in FIGS. 3A and 3B may be virtualized by the example methods and apparatus described herein. Virtualizing the example system 300 enables, among other tasks, process control personnel to simulate and test system configurations. Further, virtualizing the example system 300 may improve disaster recovery. For example, if resources hosting the virtualized system are located in an area expected to be impacted by a hurricane, other resources in a different location may be used to host the virtualized system, thereby preventing system downtime from the hurricane. Additionally, virtualizing the example system 300 enables system scenarios to be tested prior to a physical system upgrade.

Figure 4:
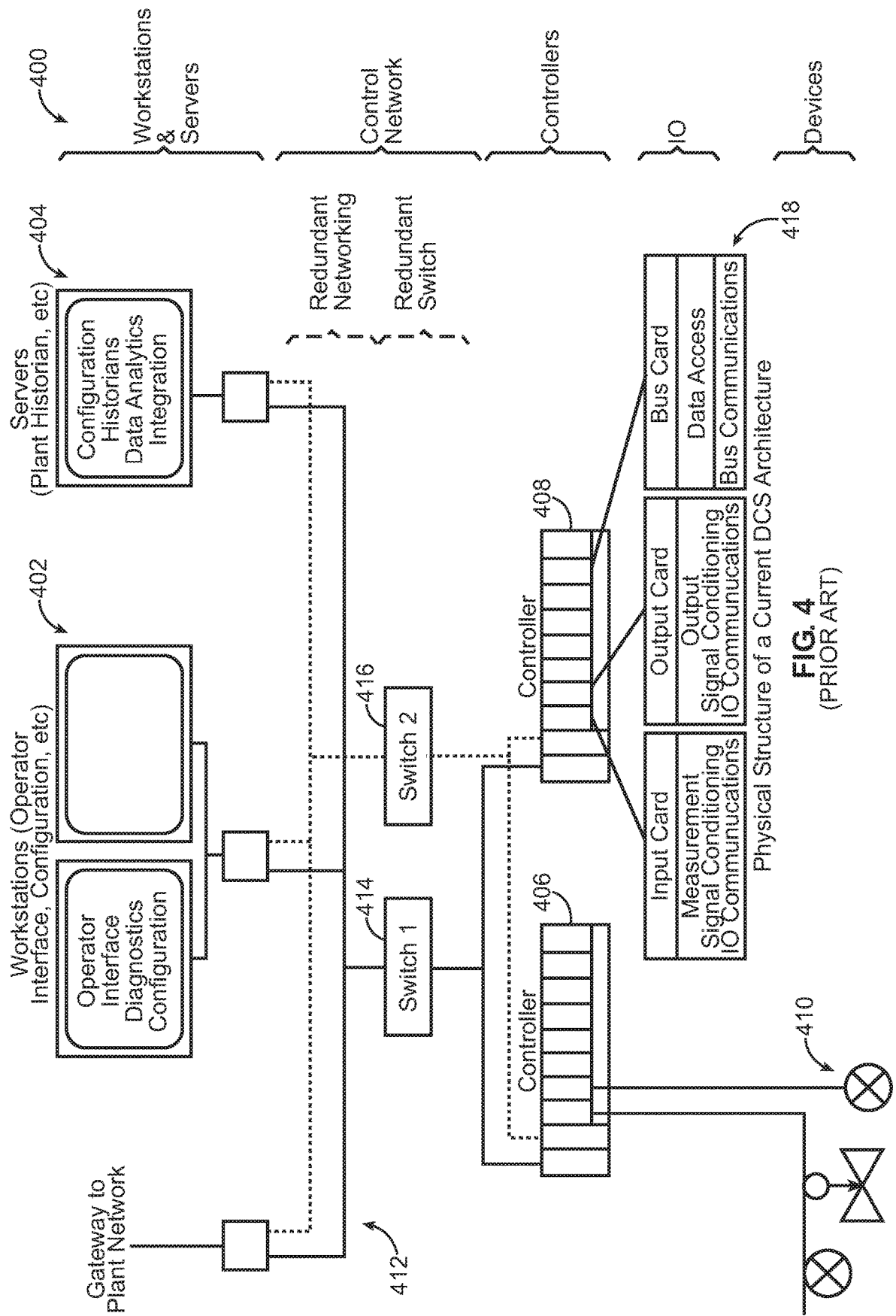
FIG. 4 depicts another known control system architecture.

A known process control system architecture 400 is shown in FIG. 4. As shown in FIG. 4, the architecture 400 includes workstations and servers 402 and 404. The workstations 402 may support user interface functions such as an operator interface, diagnostics, and/or configuration. The servers 404 support backend functions such as data collection and storage, configuration, calculations, and interfaces to external systems.

An operator interface to the process typically includes or involves the workstations 402 and the servers 404, keyboards, mice, and liquid crystal display (LCD) monitors. For example, to provide a wide view and range of control, multiple monitors may be used in various arrangements. Large LCD monitors may be used to support plant overview displays. Further, known operating systems such as Windows Server 2008 and Windows 7 may be utilized because of the broad support available to manufacturers for these systems.

Equipment that an operator uses to monitor process conditions and manipulate setpoints of the process operation may be located in a central control room or distributed on the plant floor close to the equipment. From these locations, the operator can view information transmitted from the processing area and displayed on operator displays and change control conditions, assuming proper security privileges for the operator, from an input device.

Operator display applications are typically implemented on a system wide basis in one or more of the workstations 402 and provide preconfigured displays to the operator or maintenance persons regarding the operating state of the control system or the devices within the plant. Typically, these displays take the form of alarm summary displays that receive alarms generated by controllers 406 and 408 or devices 410 within the process plant, control displays indicating the operating state of the controllers and other devices within the process plant, maintenance displays indicating the operating state of the devices within the process plant, etc.

Displays may be created through the use of objects that have an associated graphic. The object may animate the graphic on the display screen based on the received data to illustrate, for example, that a tank is half full, to illustrate the flow measured by a flow sensor, etc. While the information for the displays is sent from the devices or configuration database within the process plant, the information is used to provide a display to the user containing that information. As a result, all information and programming that is used to generate alarms, detect problems within the plant, etc. may be generated by and configured within the different devices associated with the plant, such as controllers and field devices during configuration of the process plant control system.

Programming the process control system instructions involves several configuration activities such as physical configuration, control strategy configuration, display configuration, and historical data collection configuration. These activities are generally performed in parallel and then integrated as the process control system is engineered. A configuration database enables users (e.g., plant operators) to create and modify control strategies and download these strategies via a control network 412 to the distributed controllers 406 and 408, consoles, and devices 410. Typically, the control strategies are made up of interconnected function blocks, SFCs, equipment and unit representations, etc that perform functions within the control scheme based on inputs and which provide outputs to other function blocks and/or input/output devices within the control scheme. The configuration application also allows a designer to create or change operator interfaces that are used by a viewing application to display data to an operator and to enable the operator to change settings within the process control system. Each of the controllers 406 and 408 and, in some cases, field devices 410, stores and executes a controller application that runs the control modules assigned and downloaded to implement actual process control functionality. For regulated and/or highly critical process control applications, such as those requiring FDA certification, the configuration may be versioned. The version and audit trail application records all changes, who made the changes, and when the changes were made.

A DCS may also include the ability to collect batch, continuous, and event data. A centrally defined history database may be available for the storage of historical data. The value of any attribute, alarm of any control strategy, alert, or process condition can be recorded in the history database along with its status. In modern control systems, the data values are collected as an integrated feature of the system. Events are collected and time stamped at their source. For example, the data may be collected and recorded with a resolution of a few milliseconds. Users and layered applications can retrieve the batch, continuous, and event data in a time-ordered fashion. For security reasons, values may not be edited without leaving behind an audit trail.

Security is generally a part of a DCS architecture. The DCS manages what a user is able to do by user, plant area, unit, and workstation. Layered applications may be authenticated before they are allowed access into the system. Security within a DCS may involve an authentication process by which access to the DCS for users and layered applications are controlled through the use of password protected user accounts. DCS security may also involve user-related aspects such as requiring a user of the DCS to have a user account on the system in order to gain access, naming all user accounts, providing unique names to all user accounts within the scope of a site, and requiring all user accounts to have a password to be provided in conjunction with the account name in order to start a DCS session. Still further, DCS security may involve plant area security aspects such as permitting or denying access to make changes within zero or more areas within a process control plant based on user account. For each plant area where access is permitted, access can be restricted at runtime according to the classification of the runtime attribute data can be changed. For each plant area where access is permitted, the ability to make configuration changes can be restricted. A user account can also be permitted or denied access to view or modify user account and privilege information. In some systems it is also possible to enable authorization. In these cases, one or more users may confirm by password the changing of certain parameters, starting/stopping a batch, etc Integrated diagnostics may be a feature of a DCS. Such diagnostics may cover the hardware, redundancy, communications, control, and to some extent, the software of the DCS.

The control network 412 is used to connect the controllers 406 and 408, remote input/output, and the workstations 402 and the servers 404. To provide a deterministic communication of process alarms and values, some DCS systems use proprietary networks. However, these have been largely replaced in most process control systems by inexpensive Ethernet interfaces operating at communication rates of 10 Mbps, 100 Mbps, and 1 Gbps.

Segmenting network on the control network is achieved by using switches 414 and 416. Standard switches have given way to smart switches with built-in firewall capabilities. By designing the control network 412 with smart switches, it possible to both secure the control system and manage traffic flow. To increase the reliability of the control network 412, the control network 412 may include redundant switches, redundant Ethernet cards, and/or redundant network cabling.

The controllers 406 and 408 are connected to the field devices 410 via analog, digital or combined analog/digital buses. The field devices 410 may be, for example, valves, valve positioners, switches and transmitters (e.g., temperature, pressure, level and flow rate sensors), are located within the process environment and perform process functions such as opening or closing valves, measuring process parameters, etc. Smart field devices, such as the field devices conforming to the input/output bus protocols, may also perform control calculations, alarming functions, and other control functions. The controllers 406 and 408 implement control strategies, which read measurements from the field devices 410, perform control functions, and send signals over the communication lines to actuators, motors, etc. to control the operation of the process.

Information from the field devices 410 and the controllers 406 and 408 is made available over the control network 412 to the operator workstations 402, the data historians 404, report generators, centralized databases, etc. These nodes run applications that may, for example, enable an operator to perform functions with respect to the process, such as changing settings of the process control routine, modifying the operation of the control modules within the controllers 406 and 408 or the field devices 410, viewing the current state of the process, viewing alarms generated by the field devices 410 and the controllers 406 and 408, simulating the operation of the process for the purpose of training personnel or testing the process control software, keeping and updating a configuration database, etc.

One approach that may be used to develop the layout of the control system involves maintaining the input/output devices with the unit and unit operations of the process, for example, locating a chemical reactor and a distillation column in the same physical controller. If this approach is selected, the process remains under control as long as the controller 406, 408 is functioning. To increase the reliability of this scenario, the controller 406, 408 and input/output modules, cards or devices 418 can be made redundant. The controllers 406 and 408 are further described in 'Terry Blevins, Mark Nixon. *Control Loop Foundation—Batch and Continuous Processes*, Research Triangle Park: ISA, 2010,' the entirety of which is incorporated by reference.

The input/output cards or devices 418 may address a variety of field measurements and actuators. Example types of input/output cards or devices include (1) Analog Input (isolated) 1-5 volt DC, 4-20 ma, (2) Analog Output 4-20 mA, (3) Isolated RTD input (2, 3, or 4 wire) and Thermocouple Input (B, E, J, K, N, R, S, T), (4) Discrete Input 24 VDC, 120/230 VAC, (5) Discrete Output 24 VDC, 120/230 VAC, (6) Pulse Count Input, and (7) Pulse Duration Output.

Digital transmitters and actuators may use a variety of available communication protocols and physical interfaces. Example communication interface cards include (1) HART AI-Card, 4 to 20 mA, (2) HART AO Card, 4 to 20 mA Series, (3) DeviceNet (Baud rate 125 250 500 kbit/sec), (3) FOUNDATION Fieldbus, (4) AS-Interface, (5) Profibus DP Baud rate (9.6 19.2 93.75 187.5 500 1500 kbit/sec), and (6) Serial Interface (Modbus or Allen Bradley's Data Highway Plus protocol).

In addition, some manufacturers may offer input/output cards to meet special requirements. For example, Sequence of Events (SOE) input cards are used to capture process-upset events received directly from devices in the field. Because events are captured and temporarily stored locally on the SOE input card, faster recording for each of the channels on the card is possible. For example, events captured by an SOE input card are time stamped using a ¼-millisecond resolution.

Input and output terminations are made at terminals that may be part of the electronic mounting frames or on separate terminal boards. In the case of a terminal board, a cable connection between the terminal board and the electronic controller file may be used. Connections may be made from the front of the cabinet. Alternatively, a separate termination cabinet filled with rows of terminal strips may be used. This alternate approach involves additional wiring from the termination cabinet to the terminals in the remote controller cabinet but enables the field wiring to be completed before the distributed control housings are delivered and installed.

Analog input and output signals may be conveyed via shielded, twisted pairs of copper wire. Digital inputs and outputs, either 120 volt AC or 24 volt DC, can be conveyed via twisted pairs, which do not have to be shielded. Analog signals may not be run in proximity to alternating current wiring. Many controllers are configured to process 1 to 5 volt direct current (DC) signals. Thus, one often used input is a 4 to 20 mA current signal, which develops a 1 to 5 volt input across a 250 ohm resistor mounted on the input terminal board. Some distributed control systems can accept low-level signals from RTDs and thermocouples and perform signal amplification in their input electronic circuitry. Some systems can accept pulse input with frequencies sufficiently high to allow signals from turbine flow meters to be used directly.

Most suppliers offer some conditioning of signals. Taking the square root, linearizing signals derived from thermocouples and resistance thermometers, and dampening noisy inputs can be selected by configuration. Some input/output boards provide terminals with fused 24 volt DC power that can be used to supply a positive voltage to two-wire transmitters.

Separate terminal boards may also be supplied for digital input and output signals. Optical isolation for these signals may be provided. A DC input signal (or a rectified alternating current (AC) input signal) causes a light emitting diode (LED) in the isolating relay to be energized. A photoelectric device energized from the LED actuates a transistor in transistor-transistor logic (TTL) input circuitry to signal a digital input. A digital output signal is similarly isolated to actuate a transistor driver circuit for DC outputs or a triac for AC outputs. The solid-state relay from which the output is generated functions similar to a dry contact, and the output is powered from a separate power source.

The requirements for redundancy and interfacing for input/output processing may result in a custom hardware design for the process controller(s). Multiple processors are often used to address the communication and input/output processing and control execution. Also, a real-time operating system for embedded applications may be used to provide deterministic scheduling and execution of control systems.

The term "devices" may collectively refer to transmitters such flow meters and final control elements such as valves. Smart devices provide both measurement data and diagnostic information. The diagnostic information can be used to monitor the health of the device, and to some extent, the health of the process that the devices are monitoring. To enable the entire system to run reliably, the information may be monitored on a continuous basis.

There are various methods to connect to and communicate with devices including a local control bus. Devices with a control bus interface can be connected directly to the control bus. Such devices include flow computers, gas chromatographs, anti-surge control systems and other complex field devices. Alternatively, field buses may be used. Devices with field bus capabilities can be connected by means of a DCS controller or a linking device (Gateway). Field buses include Foundation Fieldbus H1, HART, Profibus, and ASi (Actuator Sensor interface). Whereas Fieldbus H1 and Profibus are primarily used for continuous signals, ASi is used to network field sensors and actuators subject to 'on-off-control' or 'on-off-monitoring' (2-state field devices, such as proximity switches, on-off valves and on-off indicators). In a further alternative, conventional input/output may be used. For example, 4-20 mA current loop with HART may be used. The HART protocol enables configuration and diagnostics within the device to be utilized by the plant systems. Devices are further described in 'McMillan, Gregory K. *Essentials of Modern Measurements and Final Elements in the Process Industry: A Guide to Design, Configuration, Installation,*

*and Maintenance*, Research Triangle Park: ISA, 2010,' the entirety of which is incorporated by reference.

Figures 5, 5A:
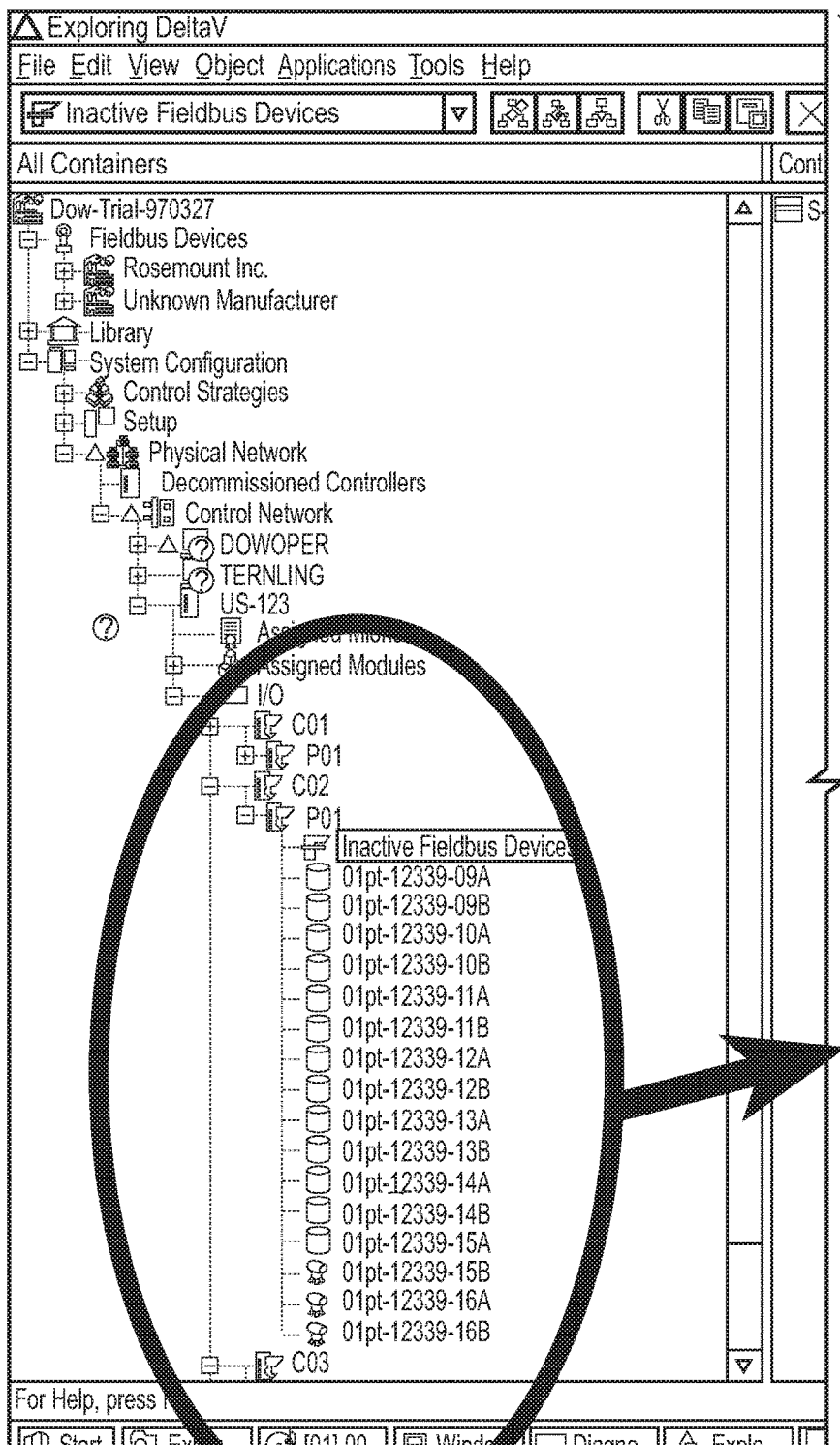
FIGS. 5A and 5B depict physical aspects of a digital control system.
Figure 5B:
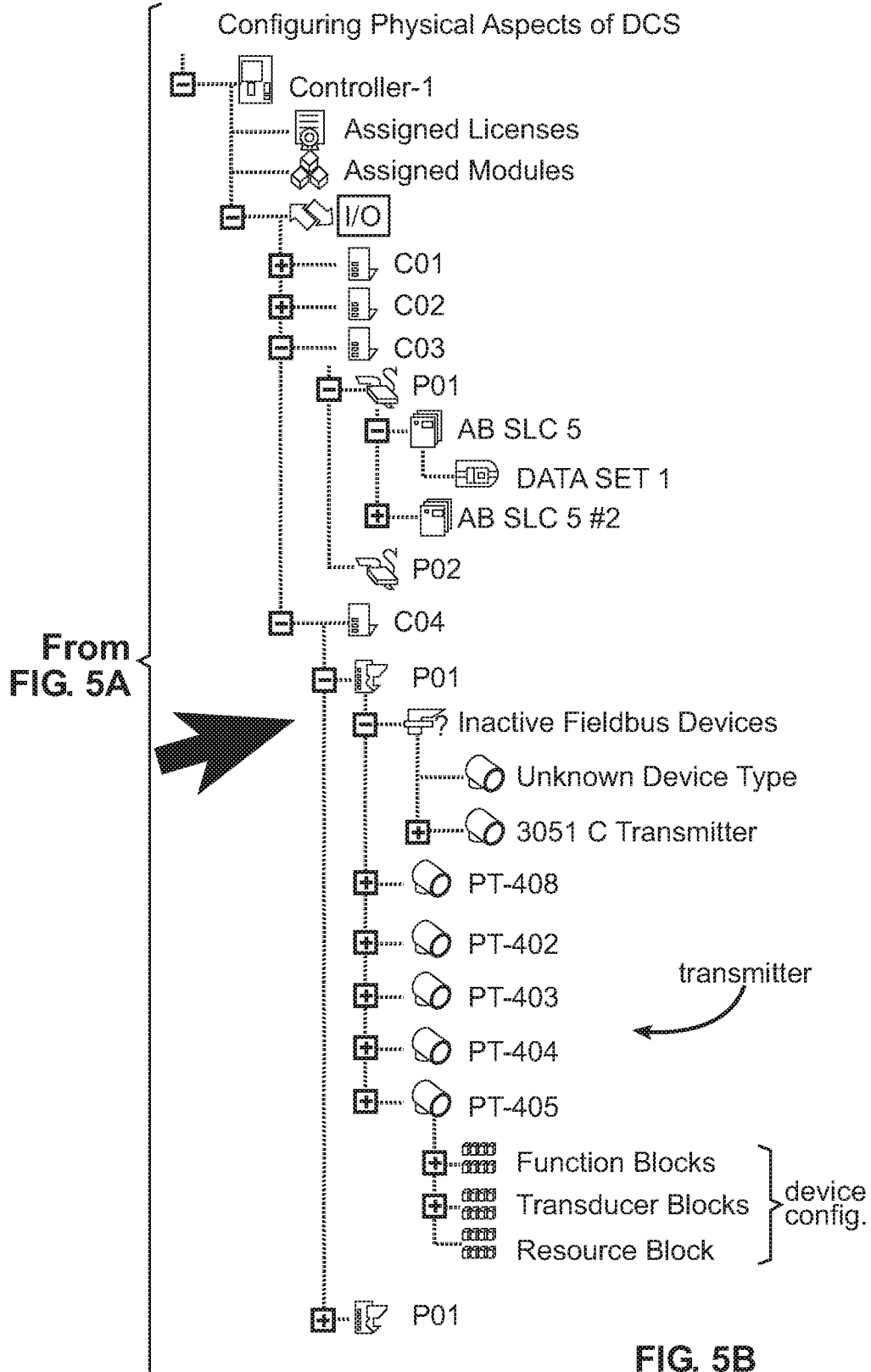
Figure 6:
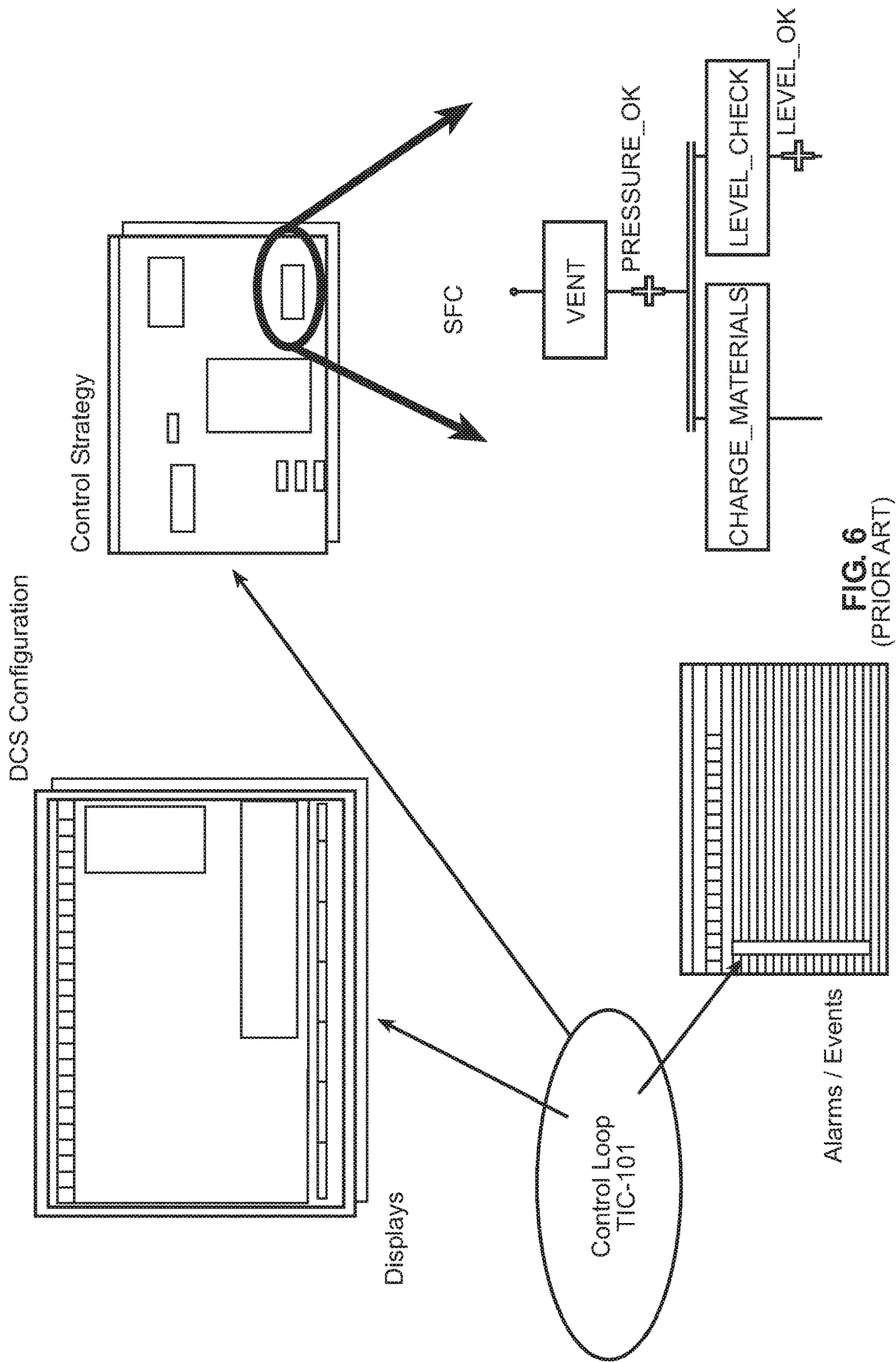
FIG. 6 depicts display, control strategy and alarms configuration that may be used with a control system.

The physical aspects of a known DCS configuration is shown in FIGS. 5A and 5B, and display, control strategy, and alarms configuration is shown in FIG. 6.

As part of configuring systems it may be necessary or desirable to test the configuration before it is deployed on the actual equipment. Various techniques have been used to achieve such testing. For example, the configuration may be tested on a virtual or simulated controller. However, with the foregoing known systems and techniques, such testing results in a substantial amount of additional work and may not test the overall performance of the system due to the very limited nature of the virtualization. To simulate the process dynamics, several forms of dynamic process simulations have been used. For the majority of cases it is possible to use specially configured control strategies to represent the process. These process simulations can be run in controllers or in virtual controllers that are part of the application/integration stations.

The example apparatus and methods to virtualize process control systems described herein may be employed without changing the core functions and features of a process control system. Instead, the example apparatus and methods described herein may be used to implement a process control system architecture that separates the functions and features from the underlying hardware. In doing so, the example apparatus and methods described herein and the DCS architecture provided thereby, enables an entire control system, or a portion of the control system, to be implemented (e.g., run) on a single server or a cluster of servers.

An example architecture implemented in accordance with the example methods and apparatus described herein is illustrated in FIGS. 7, 8, 9 and 10. As shown in these figures, virtualization enables a guest operating system, or multiple guest operating systems, to operate on a cluster of servers. The virtualized process control system or environment combines a collection of infrastructure components such as central processing units (CPUs), storage, and networking into a seamless and dynamic operating environment. The virtualized system or environment includes infrastructure services, which abstract, aggregate, and allocate hardware and infrastructure resources such as CPUs, memory, storage, and networking. The virtualized system or environment also includes application services, which ensure availability, security, and scalability for applications. The virtualized system or environment further includes management services, which provides a single point of control for the virtualized environment. Virtualization techniques that may be applied or adapted to implement the example architecture described herein are generally described in 'VMware, *Introduction to VMware vSphere*, Palo Alto, Calif., 2009,' and 'VMware, *ESXi Installable and vCenter Server Setup Guide*, Palo Alto, Calif., 2009,' the entirety of which is incorporated by reference.

Figure 7:
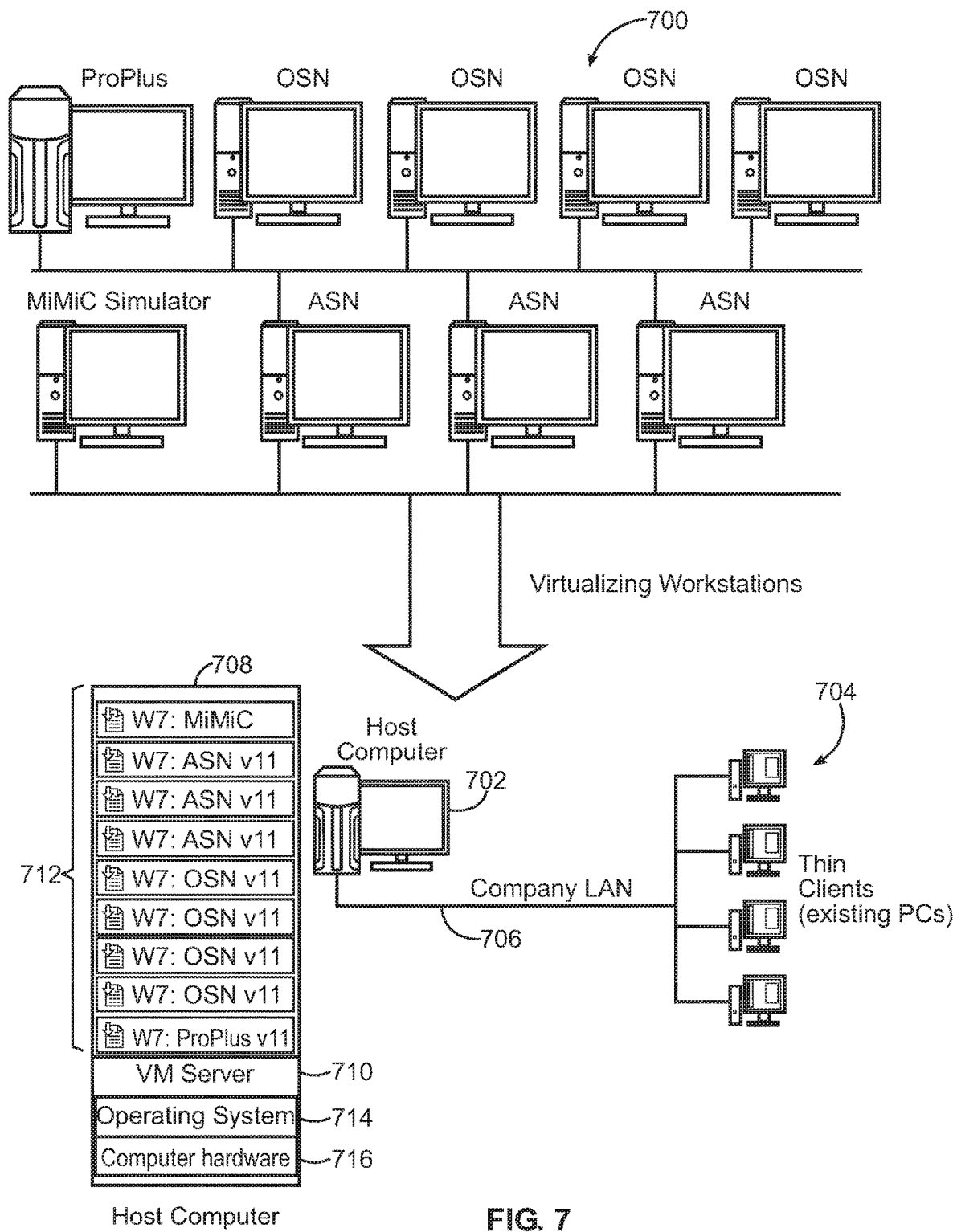
FIG. 7 depicts an example manner of virtualizing workstations and/or servers.

FIG. 7 illustrates an example manner of virtualizing workstations and/or servers 700 into a single host computer 702. As depicted in FIG. 7, a plurality of thin clients 704 may be communicatively coupled to the host computer 702 via a LAN. Additionally, as depicted in FIG. 7, software 708 within the host computer 702 is structured to provide a virtual machine server layer 710 interposing virtual workstations 712 and operating system 714 and hardware 716 layers. Each of the virtual workstations 712 includes an encapsulated application and operating system within which the application is to be executed. Thus, in this manner, the workstations 700 may be consolidated to operate within a single host computer (e.g., the computer 702).

Figure 8:
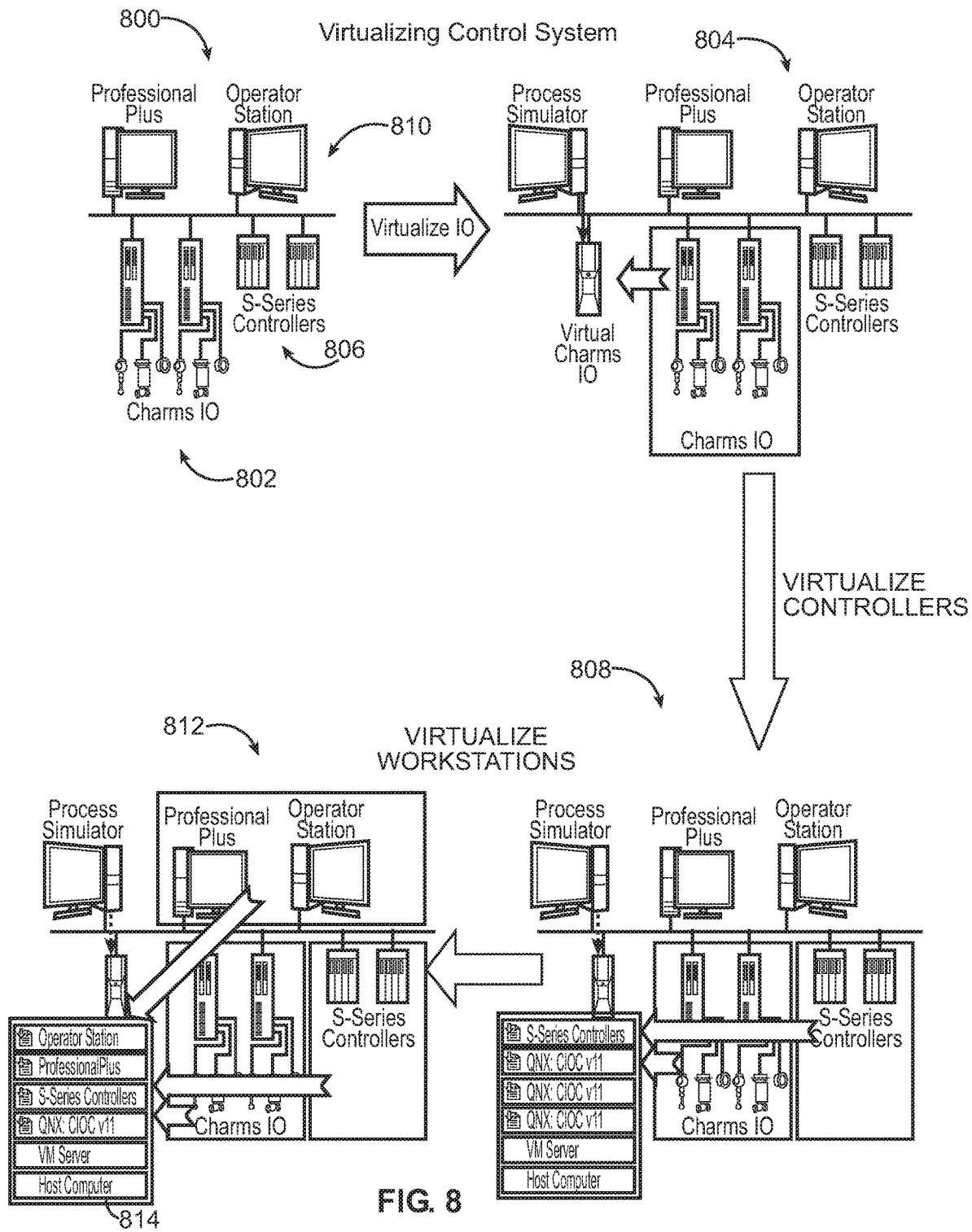
FIG. 8 depicts an example manner in which a control system may be virtualized.

FIG. 8 depicts an example manner in which a control system 800 may be virtualized. Virtualization of input/output devices 802 is depicted in the system corresponding to reference 804. Controllers 806 may additionally or alternatively be virtualized as depicted in the system corresponding to reference 808. Similarly, workstations 810 may additionally or alternatively be virtualized as depicted in the system corresponding to reference 812. Still further, while not shown in FIG. 8, field devices may alternatively or additionally be virtualized in a similar manner. The various software layers resulting from virtualization of the input/output devices 802, the controllers 806 and the workstations 810 are depicted in the block corresponding to reference 814.

Figure 9:
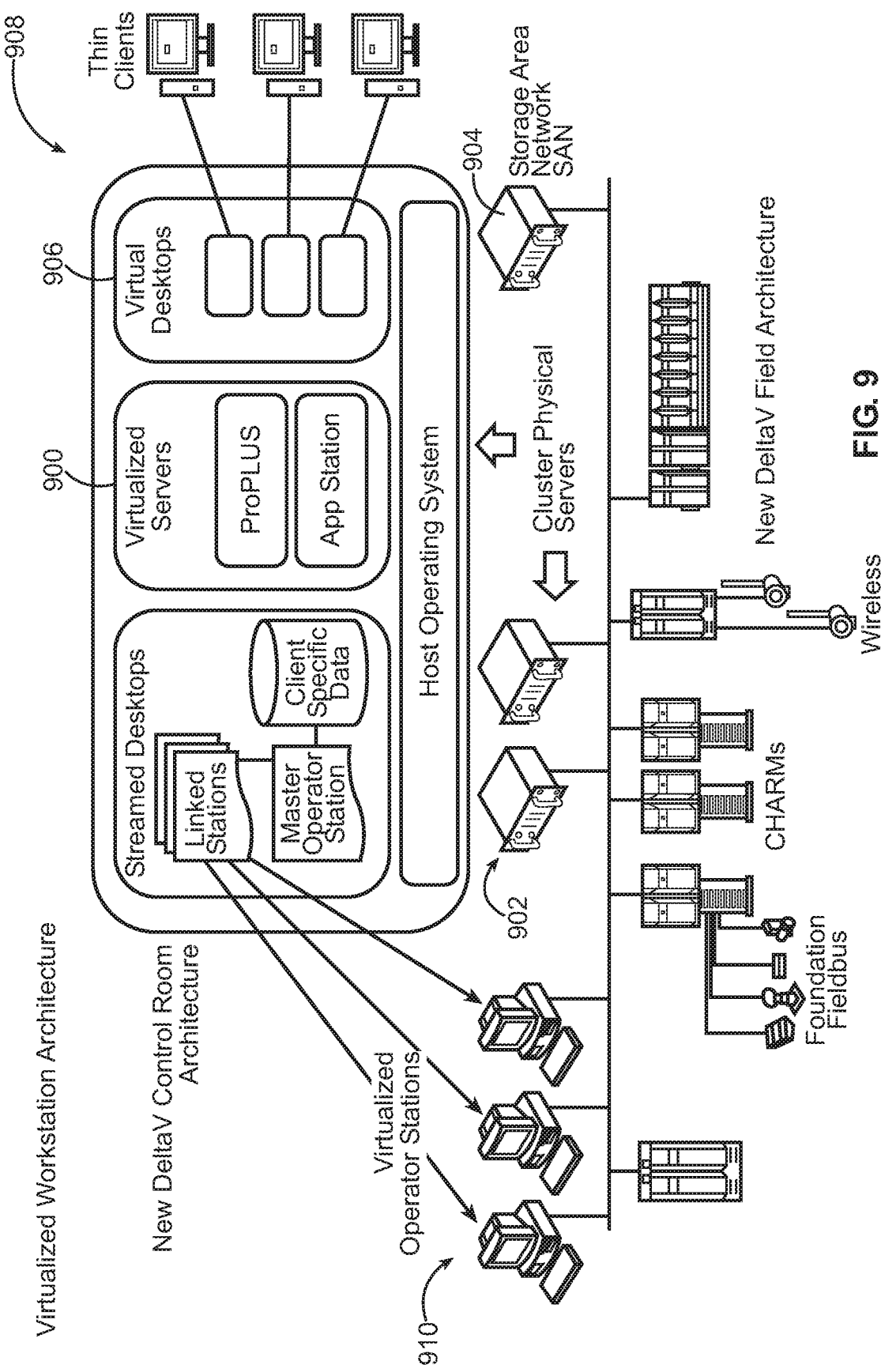
FIGS. 9 and 10 depict example architecture that may be used to perform the virtualization shown in FIG. 8.
Figure 10:
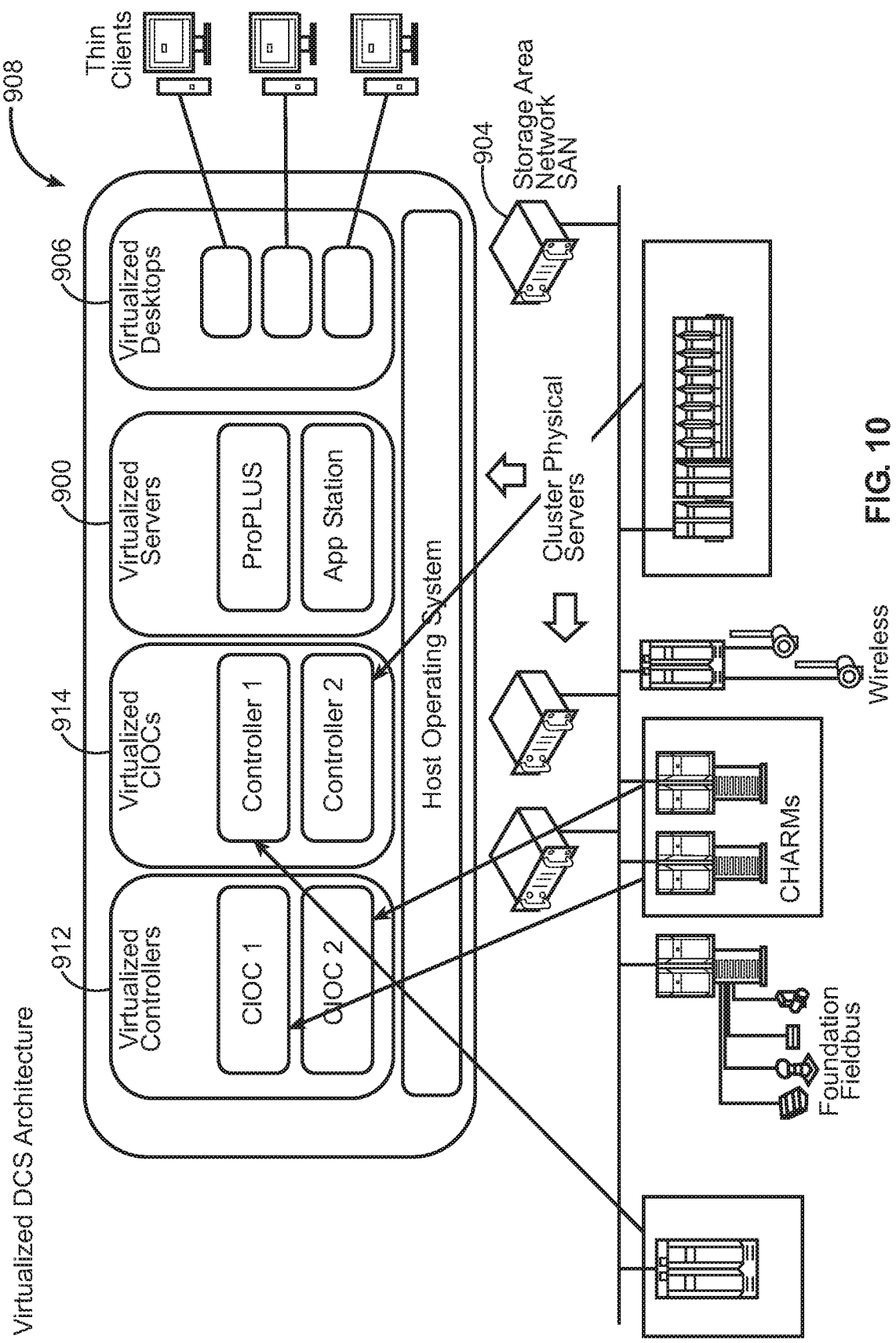

The architecture for the virtualized environment of FIG. 8 is further illustrated in FIGS. 9 and 10. As shown in FIGS. 9 and 10, virtual workstations or servers 900 run on a cluster of physical servers 902 having one or more servers. A storage area network 904 provides common storage for the guest operating systems which are running on the cluster of physical servers 902. The cluster of servers 902 provides an environment in which guest workstations or virtual desktops 906 such as operator stations and configuration stations and guest servers or the virtualized servers 900 (such as the PROPlus and Application Station) may be executed. Users may access servers and clients through remote desktop services 908, which may be launched from a users laptop, workstation, or thin client device. The cluster 902 may also be used to store images, which may be streamed out to physical desktops 910. In this case the cluster 902 may be used to manage physical images that are stored on physical hard drives.

Further, as illustrated in FIG. 10, controllers 912 and CIOCs 914 may also be virtualized. In this case, the controllers and CIOC's are virtualized and run on the cluster 902 and, when run in Fault Tolerant (FT) mode, provide same reliability as when run in dedicated hardware.

Figure 11:
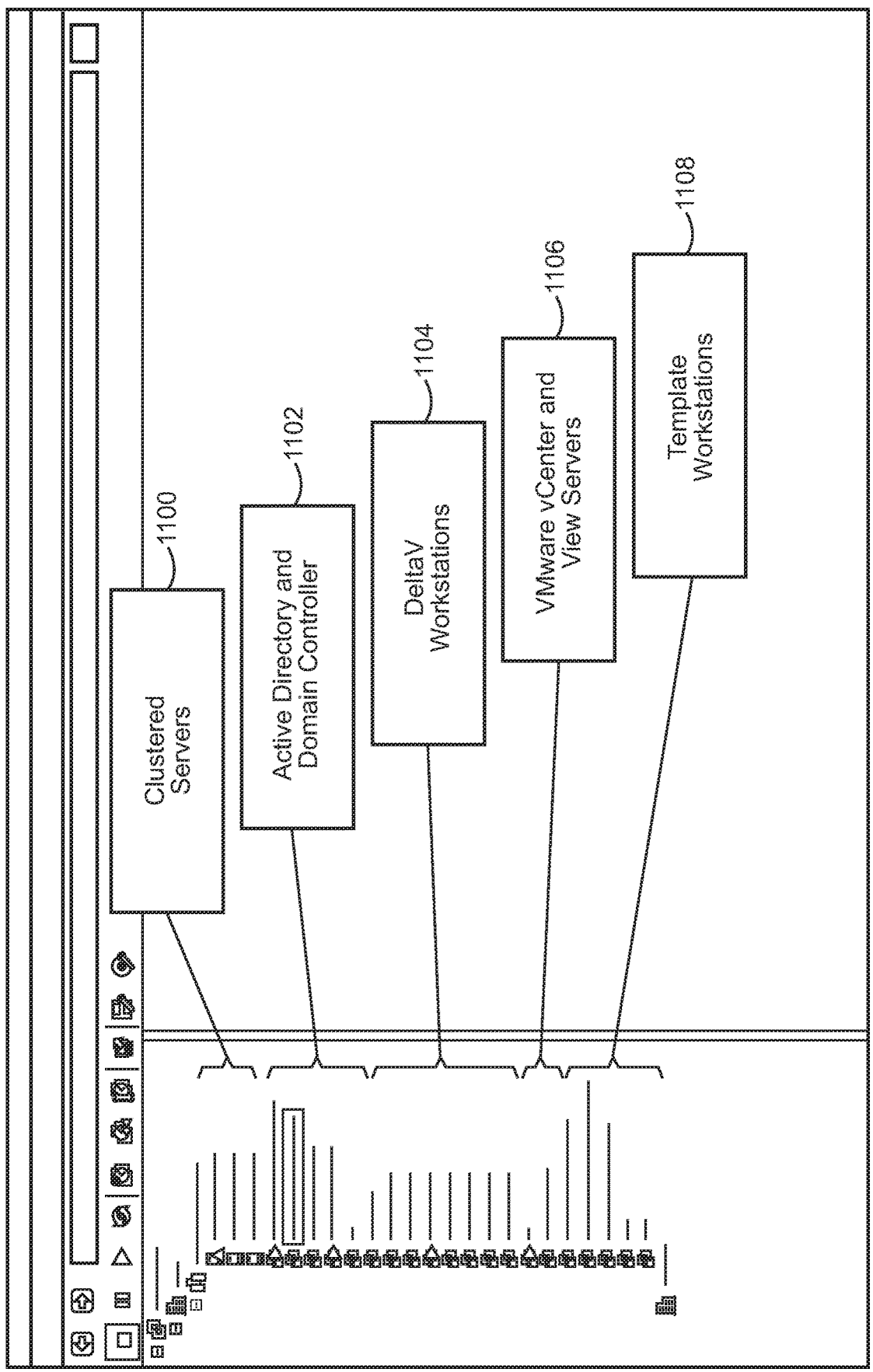
FIG. 11 depicts physical aspects of a virtualized control system.

FIG. 11 depicts physical aspects of a virtualized control system. In particular, a hierarchical arrangement of clustered severs 1100, an active directory and domain controller 1102, a workstation 1104, virtual machine software 1106 and workstation templates 1108 are depicted.

To virtualize a control system, an infrastructure bus may be used to synchronize distributed systems, controllers, and/or other distributed process control components. In examples where processes operating on the systems, controllers, and/or other distributed process control components are migrated, the example methods and apparatus described herein may use asynchronous and/or synchronous memory state and/or data state transfers. For example, to transfer operation of one set of controllers to another set of controllers, a disk and/or memory state of the controllers may be transmitted asynchronous initially. Then, after the initial disk and/or memory transfer, the set of controllers may transfer the remaining disk and/or memory state synchronously using any optimization routine to reduce total amount of data transferred and/or to reduce transfer times. In this manner, changes to the disk and/or memory state of the first set of controllers are propagated to the second set of controllers. After substantially all of the memory state and/or disk state have been transferred, the example methods and apparatus described herein may route traffic to the second set of controllers, stop the first set of controllers and transfer the remaining memory and/or disk state to the second set.

In other examples, the methods and apparatus described herein may use redundant systems, controllers, and/or other distributed process control components to transfer processes. In these examples, a redundant back plane may be utilized by a virtualized switch so that any process may be substantially seamlessly transferred between systems, controllers, and/or other distributed process control components as computing loads and/or client requirements change.

Multi-core technology allows chip manufactures to increase computational capacity without having to increase clock speeds, which would increase heat, radio emissions/interference, etc. Such multi-core technology may be used to leverage virtualization. For example, a hypervisor may execute on the hardware to enable multiple guest operating systems to use the hardware capabilities.

There are numerous benefits to the virtualization provided by the example methods and apparatus described herein. Such benefits include extended system life that minimizes upgrades due to hardware and software obsolescence, simplified migrations that reduces disruption of system upgrades and minimizes installation and maintenance costs, increased system availability including availability during maintenance and backups, increased system performance due to maximized resource utilization and scalability, improved maintenance and support due to easy patch management and security updates as well as easy remote software support.

The benefits of the example methods and apparatus described herein further include cost effective workstation deployment due to maximum utilization of computing resources and lower hardware and installation costs; lower maintenance costs due to centralized back-up and storage, easy virus protection operating system updates, and easy process control system software upgrades; improved availability due to redundant computing and data storage for critical applications and fast recovery from workstation failures; improved security due to an additional security level to limit access and provide audit and control; quicker response to threat situations; improved flexibility due to more flexible training and development systems, reduced hardware required for FAT and reduced project schedule with parallel FAT and site input/output checkout; improved support due to non-intrusive remote maintenance and troubleshooting; improved packaging as controllers can be packaged together as a cluster without having to run input/output to individual controllers; reduced engineering costs due to the ability to move control strategies between controllers without having to retest large portions of the control strategy; improved availability because clustered controllers and input/output servers can be moved between available controller and input/output computing platforms without loss of access to the system; simplified FAT because any controller loading problems can be corrected by adding CPU's; improved system distribution because clusters can be in the same plant or located remotely from the main control system to cover utility areas, tank farms, oil platforms, and remote stations (for example in hydrocarbon fields); and improved disaster recovery as clusters can be moved across high speed links to back them up.

Although certain example methods and apparatus have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A process control system, comprising:
a server cluster including at least two physical servers, the server cluster, when operating, providing:
a virtual machine to implement a virtual workstation, the virtual workstation including an encapsulated application and an operating system within which the application is to be executed;
a virtual controller to interoperate with the virtual workstation and to implement a process control strategy to control operations of one or more field devices within the process control system, the one or more field devices including at least one of a valve, a valve positioner, an actuator, a motor, or a sensor transmitter; and
a virtual input/output device to interoperate with the virtual controller and coupled to the one or more field devices within the process control system, the virtual input/output device to be virtualized in a real-time operating system and run in a fault tolerant mode, the virtual input/output device to be migrated from a first physical server in the server cluster to a second physical server in the server cluster in response to a server failure without loss of data and without a communications interruption between the virtual input/output device and the virtual controller, the virtual input/output device to enable communications between the virtual controller and the one or more field devices using at least one of a 4-20 mA analog input signal, a 4-20 mA analog output signal, a 24 VDC discrete input signal, or a 24 VDC discrete output signal.

2. The process control system of claim 1, wherein the virtual workstation is to provide a user interface to the process control system.

3. The process control system of claim 2, wherein the user interface is to provide at least one of an operator interface, a diagnostics interface or a configuration interface.

4. The process control system of claim 1, wherein the server cluster is to implement a virtual server to provide a backend service to the process control system.

5. The process control system of claim 4, wherein the backend service is to provide data storage or collection, a configuration function, a calculation function, or an interface to another system.

6. The process control system of claim 1, wherein the server cluster comprises at least one virtual machine server to interoperate with guest operating systems corresponding to each of the virtual workstation, the virtual controller, and the virtual input/output device.

7. The process control system of claim 6, further comprising a storage area network to store data for the guest operating systems.

8. The process control system of claim 1, further comprising a remote desktop service, implemented via at least one of a personal computer, another workstation, or a thin client device, to enable a user to access the virtual workstation.

9. The process control system of claim 1, wherein the virtual controller is a first virtual controller, the server cluster to provide a second virtual controller, the server cluster to transfer operation of the first virtual controller to the second virtual controller by:
asynchronously transferring a first memory state of the first virtual controller; and
synchronously transferring a second remaining memory state of the first virtual controller.

10. The process control system of claim 9, wherein the server cluster is to:
    route traffic to the second virtual controller; and
    stop the first virtual controller.

11. The process control system of claim 1, further including a storage area network (SAN) to provide a common storage accessible by the at least two physical servers.

12. The process control system of claim 1, wherein the virtual machine is to be implemented in place of a physical machine such that the virtual machine is not duplicative of a physical machine in the process control system.

13. The process control system of claim 1, wherein the server cluster is to provide a virtual field device to facilitate at least one of a simulation or testing of the process control system.

14. A process control system, comprising:
    a multi-core processing unit, the multi-core processing unit, when operating, providing:
        a virtual machine to implement a virtual workstation, the virtual workstation including an encapsulated application and an operating system within which the application is to be executed;
        a virtual controller to interoperate with the virtual workstation and to implement a process control strategy to control operations of one or more field devices within the process control system, the one or more field devices including at least one of a valve, a valve positioner, an actuator, a motor, or a sensor transmitter; and
        a virtual input/output device to interoperate with the virtual controller and coupled to one or more field devices within the process control system, the virtual input/output device to be virtualized in a real-time operating system and run in a fault tolerant mode, the virtual input/output device to be migrated from a first core of the multi-core processing unit to a second core of the multi-core processing unit in response to a failure without loss of data and without a communications interruption between the virtual input/output device and the virtual controller, the virtual input/output device to enable communications between the virtual controller and the one or more field devices using at least one of a 4-20 mA analog input signal, a 4-20 mA analog output signal, a 24 VDC discrete input signal, or a 24 VDC discrete output signal.

15. The process control system of claim 14, wherein the virtual workstation is to provide a user interface to the process control system.

16. The process control system of claim 14, wherein the multi-core processing unit is to implement a virtual server to provide a backend service to the process control system.

17. The process control system of claim 14, wherein the multi-core processing unit comprises at least one virtual machine server to interoperate with guest operating systems corresponding to each of the virtual controller and the virtual input/output device.

18. A method of controlling a process control system, comprising:
    establishing a virtual machine on a server cluster of at least two physical servers, the virtual machine to implement a virtual workstation, the virtual workstation including an encapsulated application and an operating system within which the application is to be executed;
    establishing a virtual controller to interoperate with the virtual workstation and to implement a process control strategy to control operations of one or more field devices within the process control system, the one or more field devices including at least one of a valve, a valve positioner, an actuator, a motor, or a sensor transmitter; and
    establishing a virtual input/output device to interoperate with the virtual controller, the virtual input/output device to be virtualized in a real-time operating system and run in a fault tolerant mode, the virtual input/output device to be migrated from a first physical server of the server cluster to a second physical server of the server cluster in response to a server failure without loss of data and without a communications interruption between the virtual input/output device and the virtual controller, the virtual input/output device to enable communications between the virtual controller and the one or more field devices using at least one of a 4-20 mA analog input signal, a 4-20 mA analog output signal, a 24 VDC discrete input signal, or a 24 VDC discrete output signal.

19. The method of claim 18, further comprising migrating the virtual workstation or the virtual controller from the first server of the server cluster to the second server of the server cluster during operation of the process control system.

20. The method of claim 19, wherein the first server of the server cluster and the second server of the server cluster are in different geographic areas.

21. The method of claim 19, wherein the migrating of the virtual workstation or the virtual controller is in response to a need to balance resources within the server cluster, a need to shut down one of the servers of the server cluster, or a failure of the first server of the server cluster.

22. The method of claim 19, wherein the migrating of the virtual workstation or the virtual controller comprises moving a guest operating system from the first server of the server cluster to the second server of the server cluster without data loss or without loss of a connection to an operator interface of the process control system.

23. The method of claim 19, wherein the migrating is in response to a need to recover from a disaster.

24. The method of claim 19, wherein the migrating of the virtual workstation or the virtual controller is in response to a need to change a software version within the process control system.

* * * * *